Figure 1:
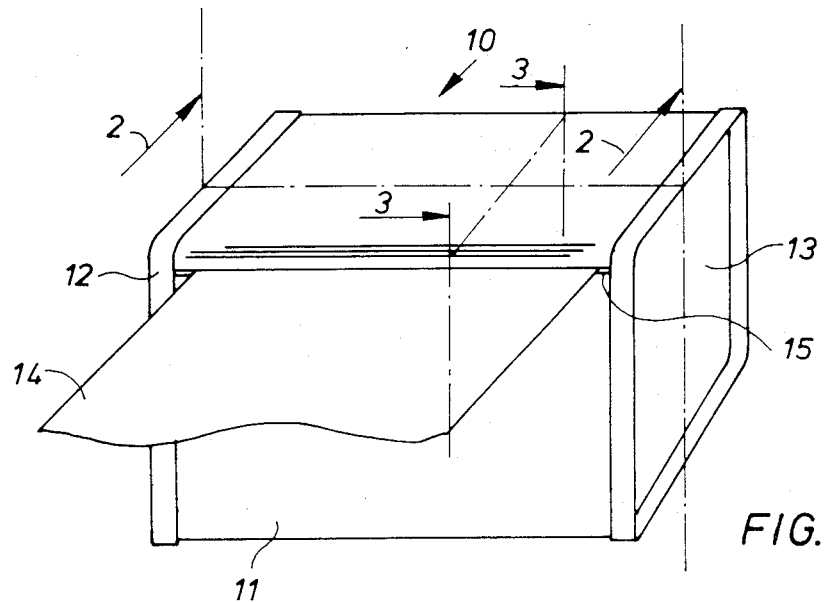

United States Patent [19]

Buelens et al.

[11] Patent Number: 4,616,914

[45] Date of Patent: Oct. 14, 1986

[54] LIGHT-TIGHT CASSETTE

[75] Inventors: Edward Buelens, Kontich; Carolus C. Goossens, Berchem, both of Belgium

[73] Assignee: AGFA-Gevaert N.V., Mortsel, Belgium

[21] Appl. No.: 703,660

[22] Filed: Feb. 21, 1985

[30] Foreign Application Priority Data

Feb. 28, 1984 [EP] European Pat. Off. ........ 84200276.8

[51] Int. Cl.$^4$ ............................................. G03B 17/26
[52] U.S. Cl. ..................................... 354/277; 242/71.1
[58] Field of Search ............... 354/275, 277; 242/71.1, 242/71.7, 197

[56] References Cited

U.S. PATENT DOCUMENTS 3,384,318  5/1968  Nerwin et al. .................. 354/275 X
4,272,035  6/1981  Sherman et al. .................... 242/71.1

FOREIGN PATENT DOCUMENTS 1073297  8/1958  Fed. Rep. of Germany ...... 354/277

Primary Examiner—L. T. Hix
Assistant Examiner—Brian W. Brown
Attorney, Agent, or Firm—William J. Daniel

[57] ABSTRACT

A light-tight cassette for photographic material, which has the form of a box (11) having wall portions (26,27) defining an exit slot (15) for material drawn from a roll (19). The exit slot has light-sealing means which is formed by cooperating flexible (31,32) lips, and generally rigid ribs (36,37) which limit the deflection of the lips. The box and the flexible lips are preferably made by the co-extrusion of suitable plastics. The cassette has the advantage that a satisfactory light-tightness of the dispenser slot can be obtained with very flexible lips, so that damage to the film by frictional contact with the lips is avoided while an effective light seal is assured for all paths of the material through the slot.

11 Claims, 10 Drawing Figures

LIGHT-TIGHT CASSETTE

The present invention relates to a light-tight cassette for holding a roll of light-sensitive material, the cassette having a peripheral exit slot through with the material can be withdrawn from the roll.

The invention can be applied for example to cassettes for use in apparatus which automatically feed light-sensitive material from a roll, e.g. in microfilming and phototype-setting apparatus.

Cassettes for holding a roll of light-sensitive material are known in form of an elongated box in which the roll of photographic material is rotatably supported, either coreless or wound onto a core, and which has in its housing or shell, and parallel with the axis of the roll of photographic material, an elongated exit slot through which the material can be withdrawn from the cassette. The exit slot is made light-tight in one way or another.

It is possible to construct a light-tight exit slot by wall portions shaped so that the light-sensitive material has to follow a labyrinth-like course. In the case of a plastics cassette made by injection or extrusion moulding, such wall portions can be integrally moulded with the shell of the cassette. This type of a construction entails a substantial risk of damaging the delicate photographic material by frictional contact with hard wall surfaces at successive points along the labyrinth.

The light tightness of the delivery slot of most modern cassettes is achieved by lining the delivery slot with a soft, resilient light-sealing material such as a pile material, e.g. plush or velvet, or a plastics foam. A pile material has a non-abrasive surface which will not damage the photographic material as it is pulled through the exit slot. The presence of the photographic material in the exit slot causes elastic displacement of the light-sealing material to such an extent that the light seal is maintained on both sides of the light-sensitive material.

The use of a resilient lining material of the pile type has several disadvantages. In the manufacture of the cassette, the lining material is derived from a roll and has to be cut into strips of appropriate length before it is applied into the exit slot. Frequently, difficulties are caused by lining strips of incorrect lengths. Also it is not easy to ensure that the strips are secured exactly parallel to the slot and in predetermined positions in relation to its entry and exit ends. Faults in this respect occur even if the operation is automated. The problem is aggravated by the small width of the slot. Techniques have been devised for circumventing this problem, such as the manufacture of one wall of the slot as a separate unit which can be assembled to the cassette after attachment of the light-sealing strips (see e.g. U.S. Pat. No. 4,272,035). However, these techniques inevitably raise the costprice of the cassettes.

Another problem relates to the bonding of the lining strips to the cassette material. The attachment of the light-sealing lining strips in the exit slot is almost always effected by means of strips of self-adhesive sheet material. It has been found that attachment in this manner is not always satisfactory, the adhesive strips tending to peel away from the cassette.

The prior art also includes light-tight cassettes wherein the exit slot is provided with flexible light-sealing lips. An example of such cassettes is discloed in DE-PS No. 1.073.297 of Zeiss Ikon AG, entitled "Anordnung zum lichtdichten Abschirmen schlitzformiger Öffnungen von Gehausen". The cassette described in that patent has its exit slot fitted with two rubber or soft plastic components shaped to provide staggered, flexible sealing lips which bear against opposite sides of the photographic material passing through the slot. In the absence of such material, the lips overlap one another and form a light-tight labyrinth.

In experiments with flexible lip seals, the problem has been encountered that at times when the path followed by the photographic material between the periphery of the roll and the exit slot makes an angle to the slot direction and the tension in the photographic material increases beyond a certain level, the sealing lips on one side of the material are deflected to such an extent that light-sealing contact between the material and the lips on its opposite side becomes lost. The direction of the light-sensitive material at the entry end of the exit slot changes increasingly as the roll of material is used up and the diameter of the roll of remaining material decreases and therefore the risk of such excess lip deflection occurring increases during consumption of the roll. Various causes may give rise to an increase in tension in the light-sensitive material at one or more times during its withdrawal from the cassette. Common causes are jamming of the roll of photographic material in the cassette, and sticking of the roll windings to each other. In the case of cassettes having restraining means for preventing clock-springing of the roll of photographic material during transportation and handling of the cassette prior to use, a force sufficient to rupture the restraining means has to be exerted on the photographic material in order to initiate its withdrawal from the cassette and the momentary high tension may result in the breakage of the light seal.

The risk of leakage of light past the sealing lips caused by excessive lip deflection as above referred to can be reduced by making the sealing lips more resistant to deflection, e.g. by making them thicker or of less flexible material. But of course either remedy entails another disadvantage, namely a greater risk of damage to the film by its frictional contact with the thus stiffened lips.

It is an object of the present invention to provide a cassette having a light-sealing means of the flexible lip type which avoids or reduces the disadvantage above referred to.

According to the present invention, there is provided a light-tight cassette for holding a roll of light-sensitive material, which cassette has a peripheral exit slot through which light-sensitive material can be drawn from the roll, and light-sealing means within said slot for making light-sealing contact with the light-sensitive material passing therethrough, said light-sealing means comprising at least one pair of flexible lips which converge towards each other in the direction of withdrawal of the light-sensitive material and at an angle to the path of the material, characterised in that to the sides of said lips facing away from the material path there are stop means located so as to arrest outward deflection of base portions of the lips before their tip portions have reached their most outward sealing positions and lose sealing contact with the material.

The invention enables a much more favourable compromise to be achieved between the need to avoid heavy contact pressure of the sealing lips against the photographic material and the need for the sealing contact to be effective over a displacement range of the photographic material towards one or the other side of the exit slot. By making use of the invention, it is easy to ensure that when the portion of the photographic material in the exit slot is pulled as far as it will go in the direction of one side or other of the slot, the sealing lip which is thereby displaced into its most outward sealing position still exerts a relatively light-sealing pressure on the photographic material, and the other lip, although becoming less flexed, nevertheless maintains effective sealing contact with the photographic material. The sealing lips can be thin and wide for providing the requisite resilience and flexibility.

The lips may be manufactured separately and attached thereafter, e.g. by glueing to the corresponding wall portion of the cassette shell, but it is far more advantageous to produce the lips integrally with the shell so that problems such as insufficient adherence and misalignment of the lips are avoided. A very suitable technique for the integral manufacture of the lips, is the production of the cassette shell and the lips by the co-extrusion of suitable plastics. A good plastics combination is for instance rigid PVC for the shell and the wall portions that define the exit slot, and soft PVC for the lips.

The light-tightness of the exit slot is improved if there are provided at least two co-operating pairs of lips in the exit slot, and if one lip partially overlaps an opposite lip at their inner ends.

Preferably the stop means for at least one of the lips is formed by a generally rigid rib on a wall portion forming one side of the exit slot of the cassette, the rib being located so as to abut a local longitudinal zone of such lip, between its root and its tip when the sealing lip flexes. If ribs are provided on the wall portions of the cassette which define the exit slot they increase the longitudinal stiffness of those wall portions. This is particularly beneficial in avoiding the phenomenon known as the "banana" defect, which is a progressive increase in the width of the exit slot from its end towards a mid-length position of the slot. This phenomenon occurs in particular in known cassettes of relatively large size, for holding photographic material of a width of 8 inches or more. This widening of the slot towards its mid-length zone is another known cause of light-leakage through the exit slot.

As an alternative to providing the stop means on slot-defining wall portions of the cassette, the stop means can be provided directly on the sealing lips. For example such stop means may be formed by shaping the lips so that they have integral ribs running longitudinally thereof, at positions between the roots and the tips of the lips.

The stop means need not be of the same form for both or all of the lips.

Figure 2:
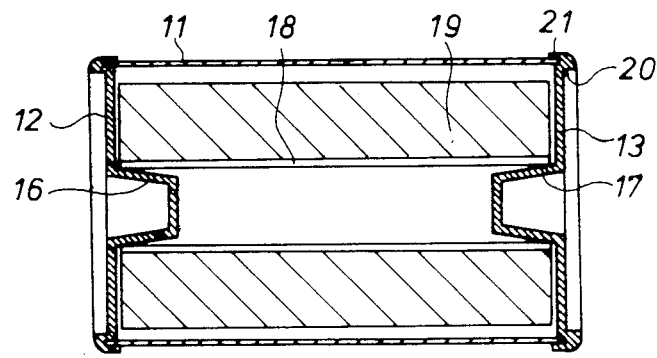
Figure 3:
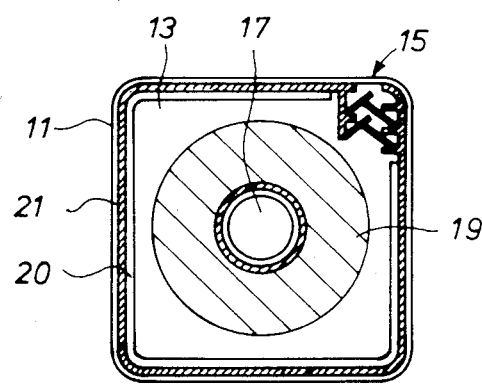
Figure 4:
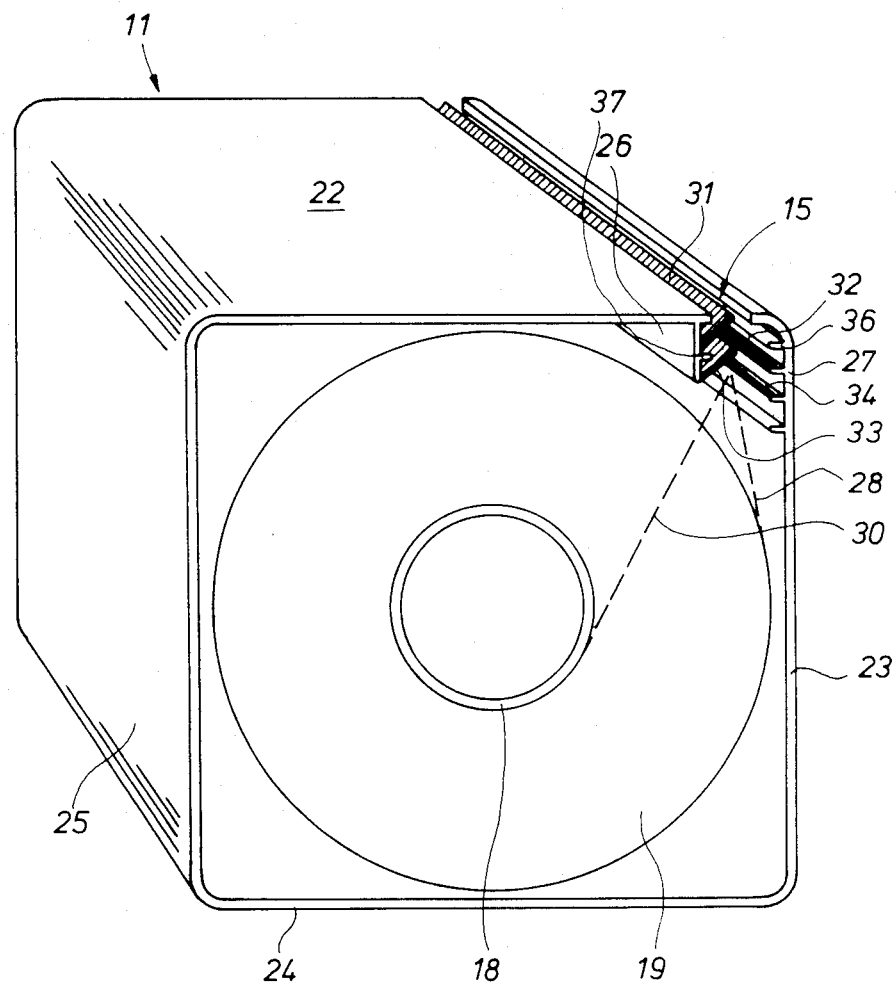
Figure 5:
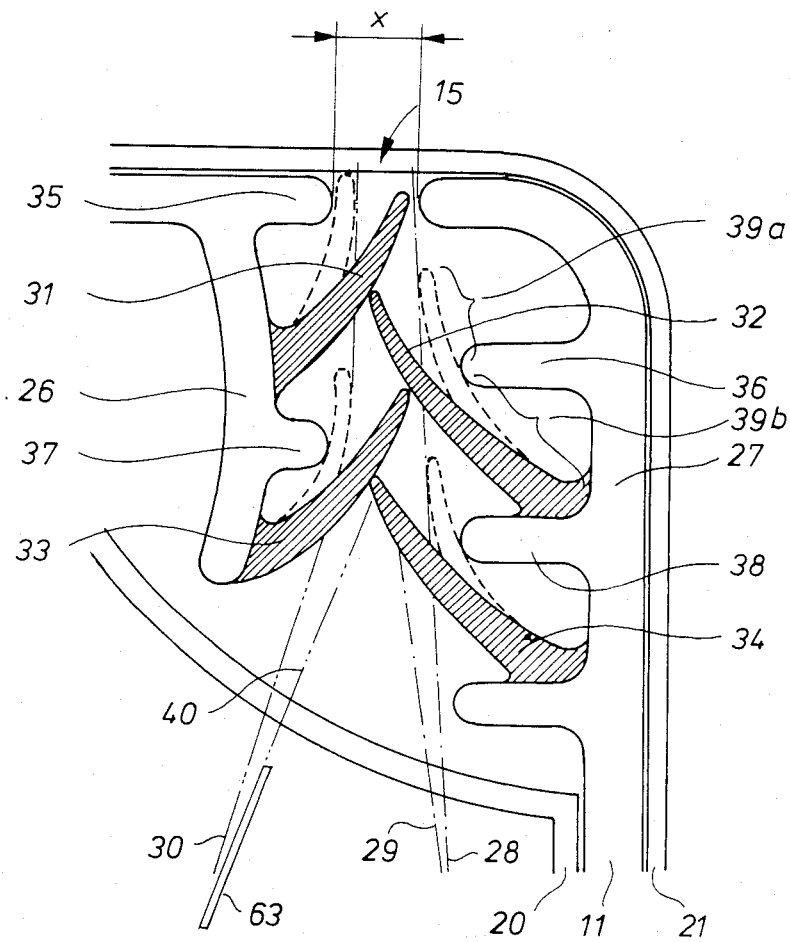
Figure 6:
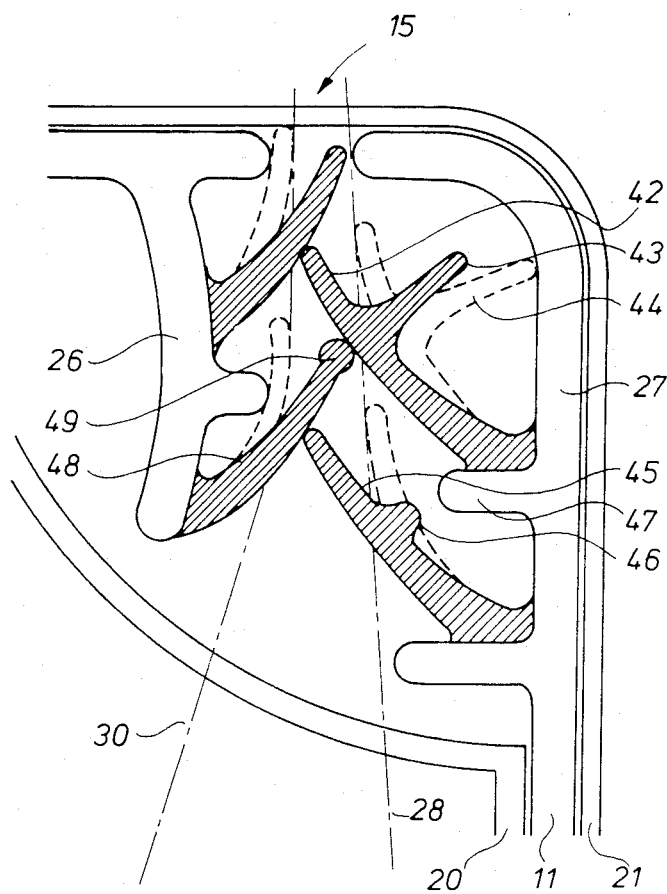
Figure 7:
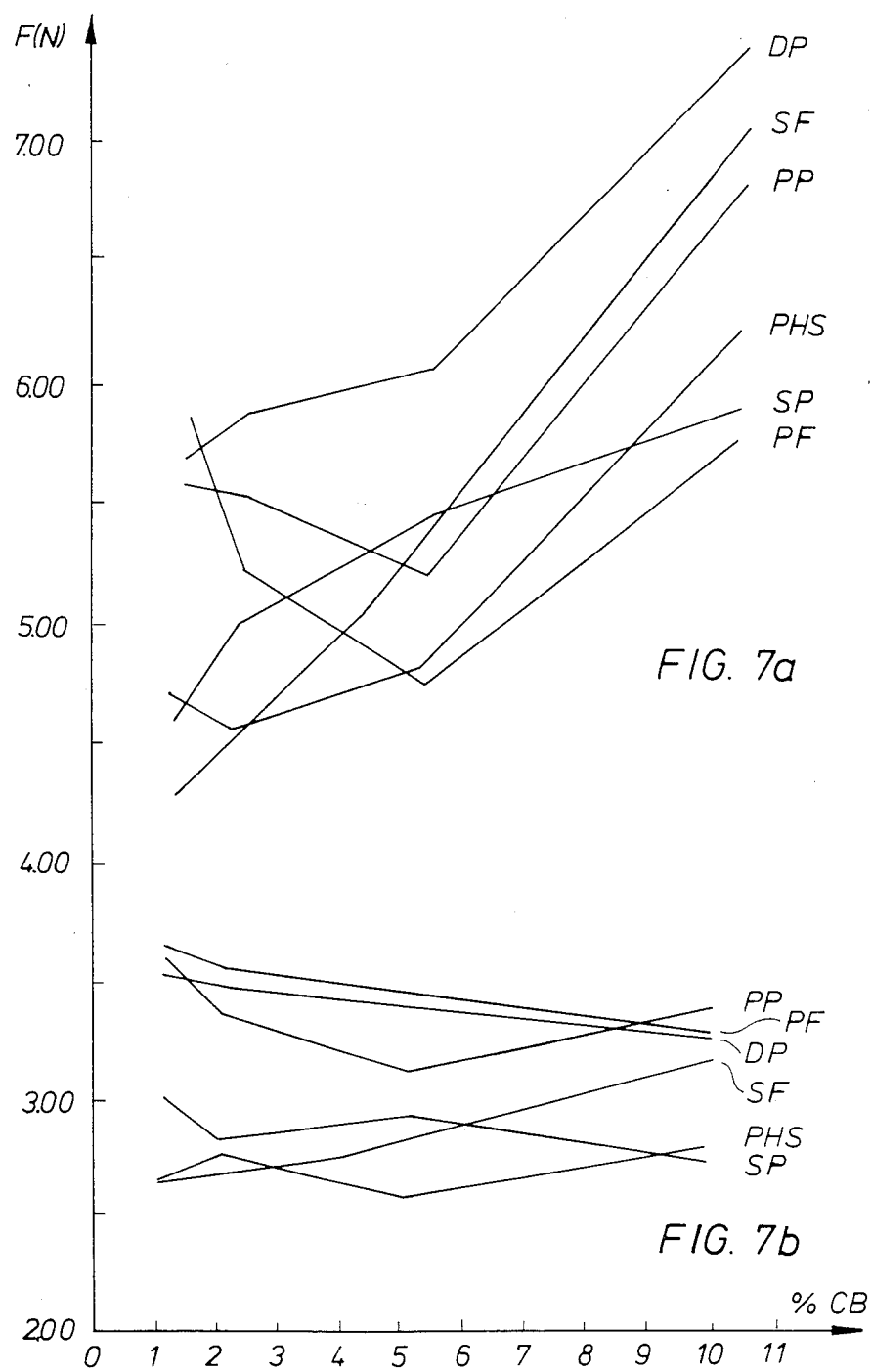
Figure 8:
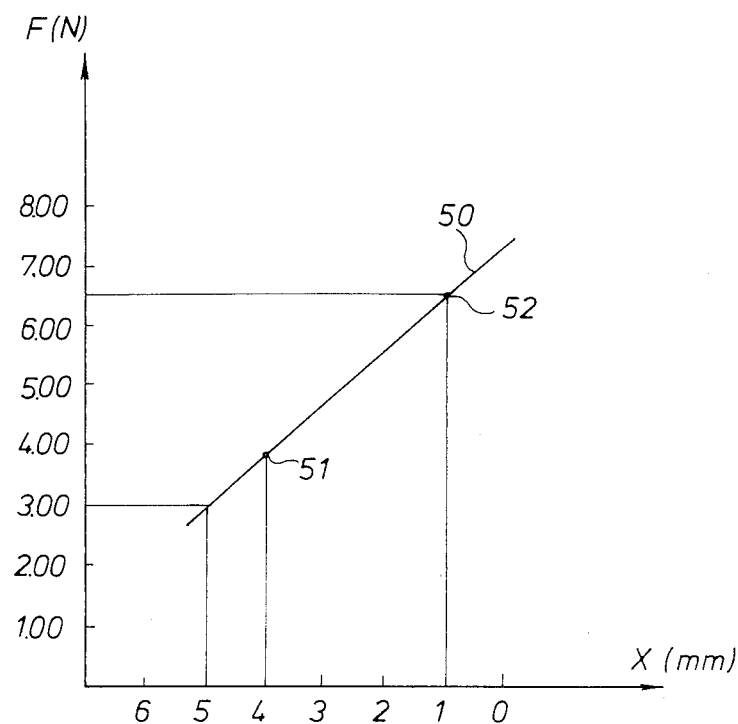
Figure 9:
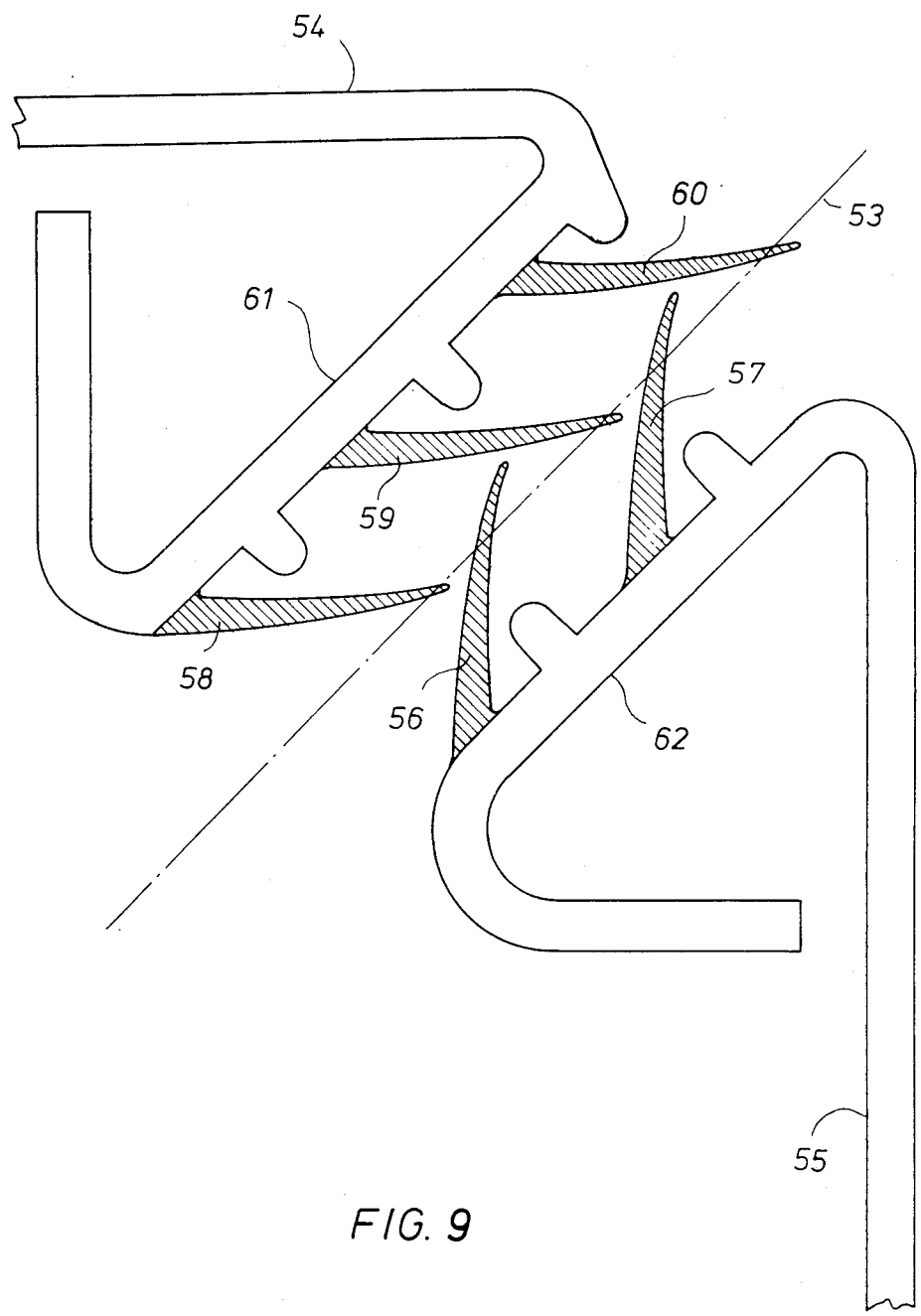

Certain embodiments of the invention, selected by way of example, will now be described with reference to the accompanying drawings, wherein:

FIG. 1 is a perspective view of one embodiment of a cassette with a light-tight dispenser slot, FIG. 2 is a section on line 2—2 of FIG. 1, FIG. 3 is a section on line 3—3 of FIG. 1, FIG. 4 is a perspective view of the cassette shell, FIG. 5 is an enlarged view of the dispensing slot of the cassette, FIG. 6 is an enlarged view of another embodiment of a dispensing slot, FIGS. 7a and 7b illustrate the pull-out force F of a film from a cassette as a function of the carbon black contents of the lips, FIG. 8 illustrates the pull-out force F as a function of the slot width x, FIG. 9 is an enlarged view of still another embodiment of a dispensing slot.

Referring to FIGS. 1 to 6, a rectangular cassette 10 for a roll of light-sensitive photographic material is shown, comprising a shell 11 and two end walls in the form of end caps 12 and 13. A photographic film 14 may be drawn from the cassette through a light-tight exit slot 15 that extends between the end caps over the full length of the shell, close to a corner portion of the shell. The photographic film has been illustrated as transparent in the figure. The shell of the present cassette is manufactured from plastics material by extrusion, whereas the end caps may likewise be made from plastic, by injection-molding or by thermo-vacuum forming.

The end caps have central hub portions 16 and 17 for rotatably supporting a hollow core 18 onto which a roll 19 of photographic film is wound. The core is a tubular body that may be made from cardboard or plastics.

The end caps 12 and 13 can have inner and outer peripheral wall portions, such as the portions 20 and 21 illustrated for the cap 13, defining a peripheral groove into which an end of the shell is light-tightly fitted. The cap can be connected to the shell ends by glueing, taping, or by stapling or nailing as known in the art.

The shell comprises four flat walls 22 to 25 joined by rounded corner portions and two wall portions 26 and 27 that define the dispenser exit slot 15.

The roll 19 of film has been illustrated in order to show in separate dotted lines the path 28 that is followed by the film as it is pulled from a full roll, and the path 30 that is followed by the film as the last winding is pulled from the core 18.

The dispenser slot 15 has a light seal formed (see FIGS. 4–5) by co-operating flexible lips 31 to 34, and ribs 36 to 38 that are provided on the wall portions 26 and 27 of the shell. In FIG. 5 the shell walls have been left unhatched, for the sake of clearness. It can be seen that the flexible lips 31 to 34 converge in a V-like configuration that points into the withdrawal direction of the film from the cassette. The lips are slightly tapered towards their free extremity and they are arranged in staggered relationship along the slot length. The lips have a slightly curved form which is due to the fact that they press slightly against each other. This urging is obtained as a consequence of the extrusion of the shell in a form that deviates from a truely rectangular form because the dispenser slot 15 is much wider than in the finished cassette. By moulding the shell in that form an ample space is created in the mould for the integral formation of the relatively wide lips by the co-extrusion of a suitable plastics. The width of a lip is its dimension from root to tip.

The desired rectangular shape of the shell, and the correct slot opening are obtained on the assembly of the cassette by urging the ends of the shell into the peripheral groove of the end caps, situated between the wall portions 20 and 21.

The ribs 35 to 38, which are integrally formed on the wall portions 26 and 27 for cooperation with the lips, improve the stiffness of the wall portions 26 and 27 and they limit the flexing deflection of the lips by abutment with the lip flanks upon exceptional tensioning of the film, e.g. for one of the reasons mentioned hereinbefore. The extreme film paths that can occur at such increased film tension are indicated by the broken line 28 for a full, and 30 for an emptying film roll.

The corresponding film paths at a normal withdrawal force are indicated by the lines 29 and 40. The flexibility of the lips is so large that in normal circumstances the film follows practically a rectilinear path between the opposite lips, and thus the paths 29 and 40 merge into one path that is disposed about centrally of the dispenser opening. The relative thickness of a film is indicated by 63 for a film that follows the path 40.

The extreme position of the lips in conditions of increased film tension are illustrated in broken lines. It will be understood that these extreme lip positions will occur only at one side of the figure at a time, the opposite lips reaching automatically their most undeflected position thereby still to keep contact with the film. Because there remains a free, unsupported lip portion, such as the portion indicated by 39a for the deflected lip 32, when the flank of the flip abuts against a rib, the lip provides a flexible support for the film, even in the case of a film path such as 28, whereby resilient frictional contact with the film is maintained but damage of the film surface is avoided.

A second embodiment of a cassette according to the present invention is illustrated in FIG. 6, wherein different modifications of the light seal illustrated in FIG. 5 have been shown. Any one or more of these modifications can be incorporated in a given cassette.

Referring to FIG. 6, it can be seen that the flexible lip 42 carries on its outer side a rib 43 which in the fully deflected position of the lip abuts against the wall portion 27, as illustrated in broken lines 44. The rib 43 runs parallel with the lip, over its entire length and is preferably integrally moulded with the lip.

Another form of co-operation of a lip with an adjacent wall portion is illustrated for the lip 45 which has a shallow rib 46 which in the fully position of the lip abuts against a rib 47 on wall sortion 22.

Another feature illustrated in FIG. 6 is the formation of a lip with a beadlike tip portion 49 (see lip 48). This bead extends over the full length of the lip and has the advantage of stiffening the tip portion of the lip so that lengthwise wave-like deformation of the lip, can be prevented.

Such a deformation can occur with very fine lips, i.e. lips which have been made very thin as compared with their width in order to obtain a very gentle contact with the film, and involves the risk of destroying the light tightness of the seal.

The lips and the co-operating wall portions of the cassette are preferably black pigmented in order to obtain a maximum light absorption. It has been found, that there is a relation between the sliding friction between the film or paper web and the lips on the one hand, and the contents of light-absorbing pigment, more in particular of carbon black, of the plastics material of the lips on the other hand. An optimum content of carbon black is apparently situated between 3 and 8% by weight of the plastic.

This correlation is illustrated in FIG. 7a, which represents diagrammatically the force F in Newtons necessary to overcome such frictional resistance as a function of the carbon black contents of the lips, in the case of an 8 inch PVC cassette, as shown in FIG. 5 and having co-extruded soft PVC sealing lips which in normal circumstances pressed against the web with a force of 875N. FIG. 7b represents the force in function of the carbon black content in the case that the contact pressure of the lips was reduced to 375N, whereas other factors remained the same as for FIG. 7a.

The following types of web materials were tested.

DP stands for "Durographic Paper", a trade mark used by Compugraphic Inc., USA, for medium-sensitive photographic material for use in phototypesetting apparatus. The processing of the material occurs by the so-called two-step stabilisation process.

SF stands for "Gevaset" SF 710, a trade mark used by Agfa-Gevaert for a high contrast orthochromatic film with a triacetate base for exposure in phototypesetting machines operating with very short exposures.

PP stands for "Permagraphic Paper", a trade mark used by Compugraphic Inc., USA, for a medium-sensitive photographic material on a resin coated paper base, for use in phototypesetting apparatus marketed by Compugraphic Inc. The processing of the material occurs according to the so-called four-step stabilisation process.

PHS stands for "Permagraphic High Speed Paper", a trade mark used by Compugraphic Inc., USA, for a high-speed, high contrast orthochromatic photographic material on a resin coated paper base for use in phototypesetting apparatus marketed by Compugraphic Inc. The processing of the material occurs according to the four-step stabilisation process.

SP stands for "Gevaset SP 90 RC", a trade mark used by Agfa-Gevaert, for a high-speed, high-contrast orthochromatic photographic material on a resin coated paper base for use in ultra-rapid phototypesetting apparatus with very brief exposures.

PF stands for "Permagraphic Film", a trade mark used by Compugraphic Inc., for a high-speed, high-contrast photographic material on a polyethylene terephthalate base for use in very rapid phototypesetting apparatus marketed by Compugraphic Inc. The material is processed according to the four-step stabilisation process.

It appears from the diagrams that there is a non-linear relation between the carbon black contents and the withdrawal force F, and it may be concluded that favourable carbon black contents that give good results for different types of photographic materials are situated within the range 3 to 8%, and the most suitable of those contents are within the range 4 to 7%.

The advantage of a cassette according to the present invention over a prior art cassette, with respect to tolerances on the width of the dispenser slot, is described hereinafter with reference to FIG. 8.

The prior art cassette which was used for the comparative test was an 8 inch cassette, in which the dispenser slot opening amounted to 3.2 mm. This is the free distance measured between the opposed wall surfaces of the shell which determine the dispenser slot, and onto which the strips of velvet were attached for forming a light-seal for the slot. The maximum tolerable deviation of the width of the dispenser opening from the nominal width was found to be 0.4 mm. In the case of an increase of the slot width by more than 0.4 mm, it was found that the exit slot was no longer reliably light-tight over a medial portion of the slot length where the pressure excerted by the slot wall portions on the sealing lining is minimal.

The compared cassette according to the present invention was an 8 inch cassette as shown by FIGS. 1 to 5, in which the co-operating flexible lips ensured a satisfactory light seal of the dispenser slot for widths x, see FIG. 5, of the opening varying between 1 and 4 mm.

The different widths between 1 and 4 mm were obtained by clamping the ends of the shell of the cassette between suitable flanges so that the desired different opening widths were obtained. The relation between the pull-out force of a film from the cassette, and the width of the opening x is illustrated by the curve 50, see FIG. 8. The point 51 indicates the lower limit below which the light tightness of the dispenser slot becomes problematical, whereas the point 52 indicates the upper limit beyond which the pull-out force F became unacceptable, namely 675N.

Another embodiment of a cassette according to the invention is illustrated in FIG. 9, which illustrates a detail view of a light seal in a cassette wherein the dispenser slot is situated centrally of a corner of the cassette so that the outlet path of the photographic material is according to a line 53 that is at 45° with respect to the side walls 54 and 55 of the shell. The light seal is formed by co-operating flexible lips 56, 57 and 58, 59 and 60 that are formed integrally with corresponding wall portions 61 and 62. In this embodiment the lips do not touch each other in the rest position, i.e. when no web is passed between them.

The invention is not limited to the described embodiments.

The flexible lips and the ribs may be formed as a separate component that may be attached by clamping, sealing, or the like to the margins of a dispensing slot in a shell.

In the case of the provision of the light seal as a separate component, the shell may be made from a plastics by injection moulding, by stamping from sheet metal, from paperboard or corrugated board, etc. However, as mentioned already in the introduction of this specification, it is preferably for the shell and sealing lips to be co-extruded using a rigid plastic for the proper shell, and a weak plastic for the flexible lips. This technique theoretically permits a shell to be made in uninterrupted lengths, and the cassettes for different film formats, more in particular for different film widths, may be obtained simply by cutting the extruded shell into the desired lengths and fitted with end caps.

The technique of co-extrusion may also be used for making the corner portions of the cassette shell of a weaker, e.g., bendable, plastic than that used for the flat wall sections. In the mentioned way, a cassette shell may be extruded in unfolded form whereby the delicate mold components for the formation of the opposite lips of the cassette exit are well remote from each other so that there is a greater freedom for the provision of suitable cooling channels in the mold to cool the extruded plastic more rapidly at the place of the lips.

The flexible corners permit the folding of the shell into its final tubular form without deformation of the flat wall sections.

The cassettes according to the present invention may have any suitable form such as a prism, cube, parallelepipedon or trapezium.

One of the end walls may be integral with the shell, e.g. in a plastic cassette made by injection moulding, but in such a case the light-sealing lips must be provided in the cassette by separate components.

The flexible lips can be given a treatment, e.g. a coating with an appropriate solid lubricant, to reduce the coefficient of friction with respect to the web of film or paper.

The cassette can be designed for easy opening, so that it may be readily reloaded with fresh material by the customer.

We claim:

1. A light-tight cassette for holding a roll of light-sensitive material, which cassette has a peripheral exit slot defined between opposed spaced apart generally parallel slot walls and through which light-sensitive material can be drawn from the roll along a path therethrough, and light-sealing means within said slot for making light-sealing contact with the light-sensitive material during its passage through said slot, said light-sealing means comprising at least one pair of opposed flexible lips, each projecting from one slot wall at an angle thereto in converging relation to the other in the direction of passage of the light-sensitive material through the slot and into generally overlapping relation adjacent their free ends, said ends being adapted to flex away from the opposing lip toward the corresponding side wall during passage of said material therebetween, and generally rigid stop means disposed in the included angle between each such lip and the corresponding slot wall and adapted to limit flexing of the respective free lip ends toward the corresponding side wall to maintain sealing contact with said material during passage through said slot.

2. A cassette according to claim 1, wherein the lips of at least one of said pair of lips are arranged so that when the lips are not deflected by intervening material the tip portion of one of the lips projects inwardly across the tip of the other lip.

3. A cassette according to claim 1, wherein the stop means for at least one of the lips is formed by a rib on said slot which rib is located so as to abut a local longitudinal zone of such lip, between its root and its tip.

4. A cassette according to claim 3, wherein said abutment zone is approximately a mid-width zone of the lip.

5. A cassette according to claim 1, wherein the stop means for at least one of the lips is formed by a rib formed integrally with such lip, and running longitudinally of the lip, at a position between its root and its tip, said rib projecting toward the corresponding wall.

6. A cassette according to claim 1, wherein its light-sealing lips are arranged in staggered relationship along the exit slot.

7. A cassette according to claim 1, wherein the light-sealing lips are made of synthetic polymeric material and are enclosed in cassette wall portions which are made of a different synthetic polymeric material, and wherein said lips and wall portions have been co-extruded.

8. A cassette according to claim 7, wherein said lips and said wall portions have been co-extruded with a peripheral shell of the cassette.

9. A cassette according to claim 1, wherein the light-sealing lips are made of flexible PVC and are enclosed in slot wall portions made of rigid PVC.

10. A cassette according to claim 1, wherein the lips are made of a synthetic polymeric material incorporating carbon black as filler in an amount of 3 to 8% by weight.

11. A cassette according to claim 1, wherein there is at least one pair of light-sealing lips which decrease in thickness towards their tips and terminate in a thickened bead.

* * * * *